United States Patent [19]

MacCulloch

[11] Patent Number: 5,078,466
[45] Date of Patent: Jan. 7, 1992

[54] FIBER OPTIC ROTARY JOINT

[75] Inventor: David B. MacCulloch, Saugus, Calif.

[73] Assignee: Allied-Signal Inc., Morris Township, Morris County, N.J.

[21] Appl. No.: 688,194

[22] Filed: Apr. 19, 1991

[51] Int. Cl.⁵ .......................... G02B 6/36; G02B 7/26
[52] U.S. Cl. .................................................. 385/26
[58] Field of Search ............... 350/96.20, 96.21, 96.22

[56] References Cited

FOREIGN PATENT DOCUMENTS 0106192  4/1984  European Pat. Off. .

*Primary Examiner*—William L. Sikes
*Assistant Examiner*—Robert E. Wise
*Attorney, Agent, or Firm*—Terry L. Miller; Robert A. Walsh

[57] ABSTRACT

A fiber optic rotary joint provides for a comparatively large number, up to 500 or more, of optical fibers to cross a rotary-stationary interface. A large, but finite number of turns are allowed between the rotary and stationary parts of the joint structure, but communication of optical signals along the fibers may continue uninterrupted while relative rotation of the joint components is underway. The joint also provides for environmental sealing and a possible pressure differential between the rotary and stationary environments connected by optical fibers through the inventive joint. Means are provided to safeguard the joint against overwinding as would result from an excessive number of relative rotations between the components of the joint.

24 Claims, 4 Drawing Sheets

FIBER OPTIC ROTARY JOINT

FIELD OF THE INVENTION

The present invention is in the field of rotary joints or connectors for passing optical signals or other power or communication media through an interface between a stationary and a relatively rotating reference frame.

BACKGROUND OF THE INVENTION

The field of fiber optics for conveying of communication data, voice, and data pulse trains has expanded greatly in recent years. The use of fiber optics transmission techniques is now well accepted in the telephone and data transmission arts. Optical multiplexing to enable each fiber to carry a great multitude of data and voice channels is well understood.

However, several technologies require the passage of power or communication signals (voice or data streams) across an interface between a rotary reference frame and a non rotary or stationary reference frame. One such application is the instrumentation of rotary devices, such as the rotors of electrical generators, when it is desired to collect stress, vibration, temperature, pressure, and other data form the apparatus in operation. In such a case, the necessary sensors and transducers mounted on the rotor of the apparatus, many of which are electrical, may have their data converted to optical signals, and passed through an optical rotary joint during operation of the apparatus. Similarly, command signals for the test apparatus on the rotor may be passed across the joint to the electrical test instruments while the apparatus is in operation. The techniques of optical multiplexing allow a limited number of optical fibers to suffice in this usage.

A conventional fiber optic rotary joint is provided by Focal Technologies of Dartmouth, Nova Scotia, Canada, which allows up to 10 optical fibers to feed into and out of the joint. This rotary joint permits unlimited members of rotations between the stationary and rotary parts of the joint. However, as noted above, the sensors and control devices aboard the rotating reference frame may be electrical powered, in which case either an on board power source must be provided, or power must be fed to the rotary apparatus another way. To this end, frequently, a fluidic, or electrical slip ring device is used in conjunction with a conventional fiber optic rotary joint. In the former case, the fluidic slip ring may simply carry pressure signals to a non rotational interpretation, recording, or indicating device. In the latter case, the electrical slip ring is employed to feed electrical power onto the rotary device, there to power electrical sensors, as well as the electrical-to-optical converters and optical multiplexing devices.

However, there exists a desire to provide communication with a device associated with a relatively rotating reference frame, which device is entirely optically powered. That is, only optical signals are to cross the rotating-stationary interface to and from the device. Further, in connection with the definition of this need it appears that unlimited numbers of relative rotations of the rotary reference frame are not required. A limited number of rotations of the rotary frame in each direction of rotation will suffice.

More particularly, a need exists to provide communication from a stationary frame to a plurality of sensors arrayed along a length of elongate sensor-carrier cable reeled upon or unreeled from a storage drum. Because the sensor-carrier cable is of finite length, a sufficient number of rotations of the storage drum to completely reel and unreel the cable will suffice. This use may require from a few turns to a few hundred turns of the storage drum. However, an unlimited number of turns of the storage drum is not required. However, communication with the sensors on the cable must be continuous, without interruption while or alteration of the transmittal optical signal the storage drum turns or is stationary. Communication to be provided may be via optical fibers, or with the use of electrical conductors, or other communication media conduits.

SUMMARY OF THE INVENTION

In view of the above, the present invention provides a rotary joint having a pair of coaxial and radially congruent annular surface-defining bodies which are relatively rotatable. The two bodies define radially disposed circumferential surfaces confronting one another across a radial gap defined therebetween. In the radial gap a flexible shape-retaining carrier ribbon extends spirally from the one body to the other. The carrier ribbon includes at least one conduit member extending continuously from end to end. The conduit member may be an optical fiber, or optionally may be an electrical conductor or fluid conduit. Each of the bodies has means for interfacing the one or more conduit members of the carrier ribbon with like conduits extending externally of the joint apparatus. Finally, each one of the bodies of the rotary joint is fixably associated with a respective one of a pair of relative rotatable reference frames.

More particularly, one of the bodies of the inventive rotary joint may be secured to a winch frame while the other body of the joint is rotational with the winch drum. A sensor-carrier cable on the winch drum is communicable with the non rotational reference frame where the winch apparatus is mounted via the conduit members of the rotary joint.

BRIEF DESCRIPTION OF THE DRAWING FIGURES

FIG. 1 is a perspective view of an optical rotary joint embodying the present invention;

FIG. 2 provides a partially cross sectional view taken generally along arrow 2—2 of FIG. 1, and viewing in the direction of the arrows;

FIG. 2A provides a fragmentary sectional view of the structure shown within the encirclement referenced on FIG. 2, and with component parts shown in alternative relative positions to better depict salient features of the invention;

FIG. 3 is a fragmentary cross sectional view taken at line 3—3 of FIG. 2.

DETAILED DESCRIPTION OF THE PREFERRED EMBODIMENT OF THE INVENTION

Figure 1:
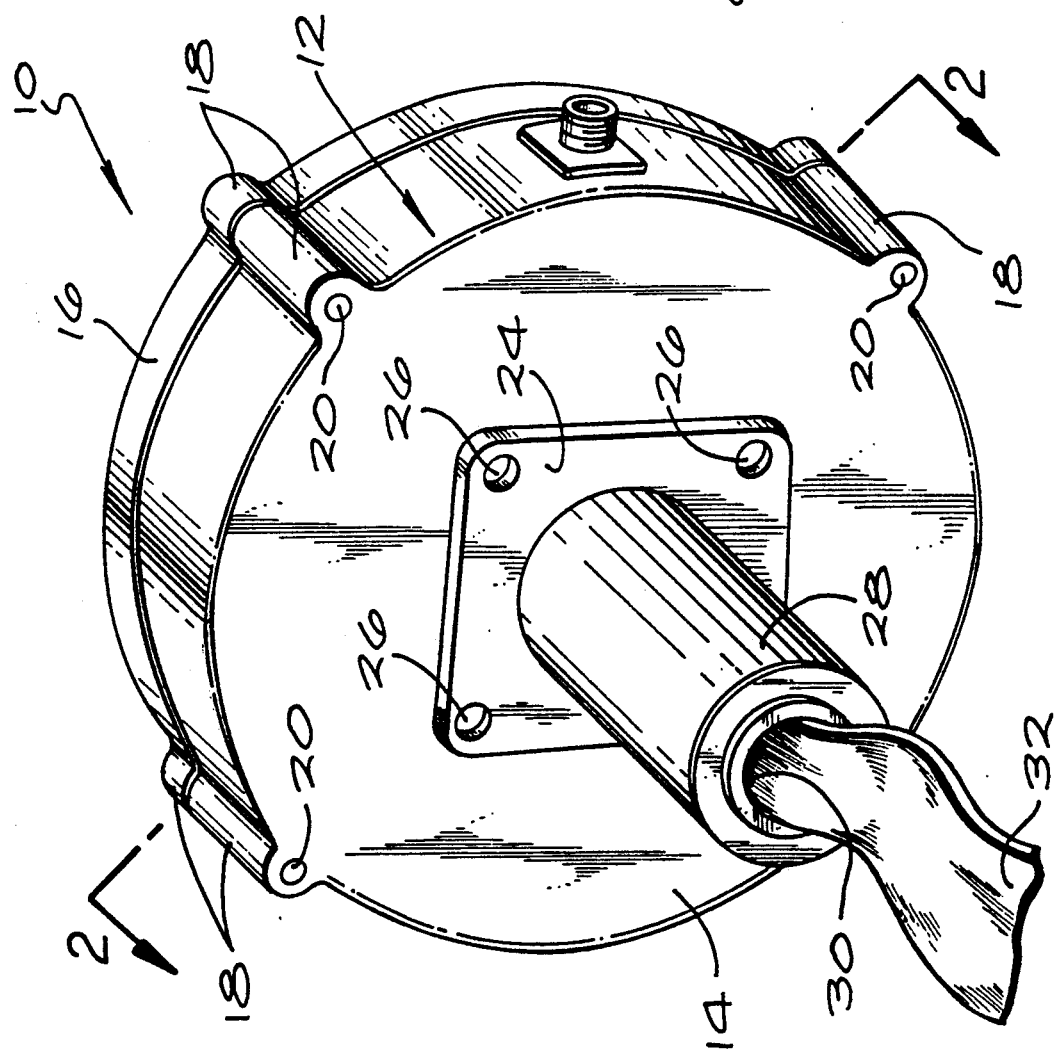
Figure 2:
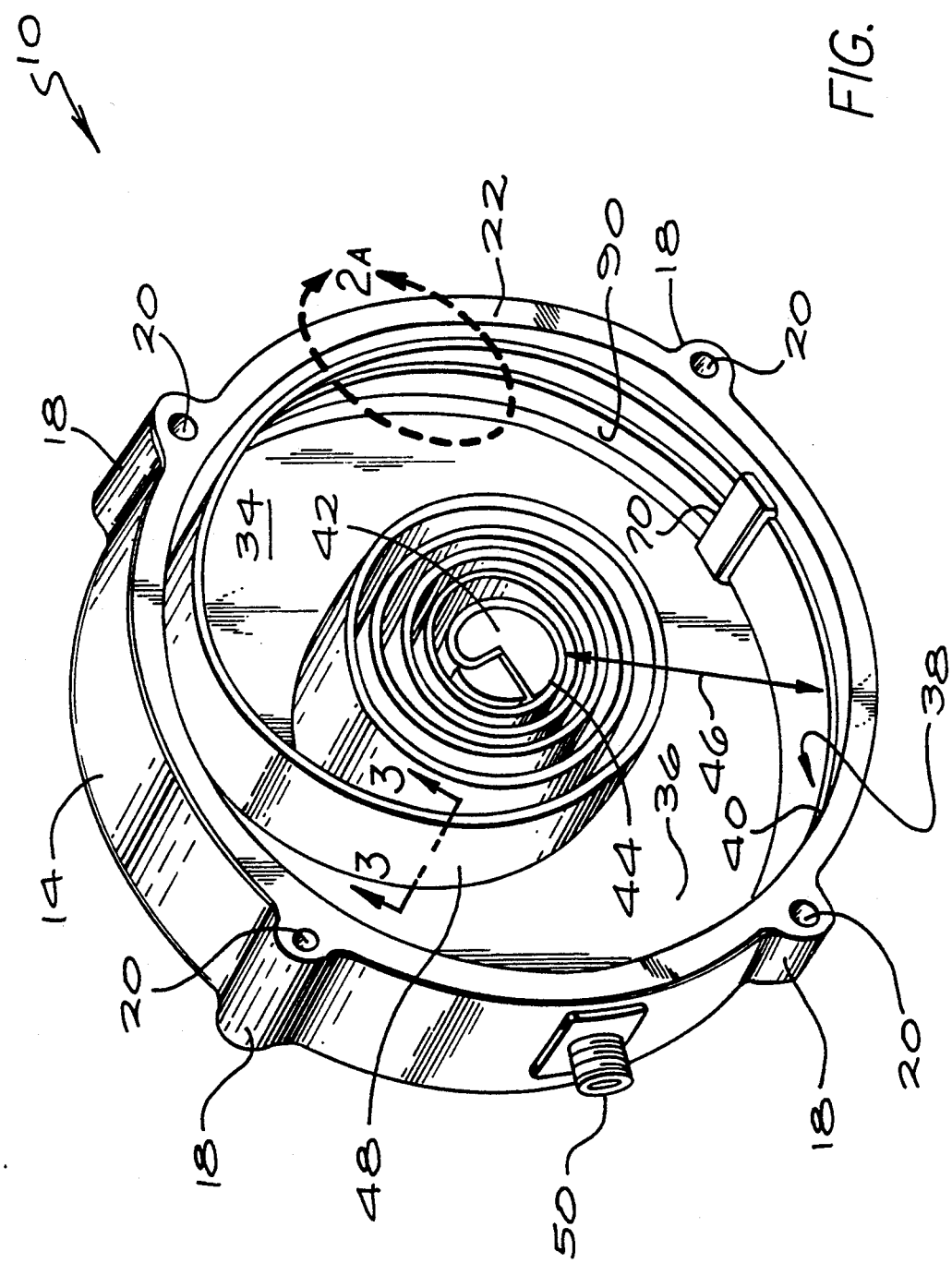

FIGS. 1-3 in conjunction illustrate a fiber optic rotary joint 10 embodying the present invention. Joint 10 includes a two part housing, generally referenced with the numeral 12. In order to sealingly secure the two parts of the housing 12 together, both the generally cup-shaped front part 14, and the plaiar back plate 16 of the housing 12 includes a plurality of circumferentially arrayed bosses 18. At the bosses 18, the housing defines respective bores 20 for receiving fasteners, such as bolts (not visible in FIG. 1). As mentioned, the housing 12 includes a cup-shaped first portion 14, and a generally planar back plate or closure member 16, spanning and closing the open end 22 of the first portion 14.

At the end of housing 12 opposite the opening 22, the housing defines a central axially disposed mounting face 24. The mounting face 24 includes plural bolt holes 26 whereby the housing portion 14 may be secured to a non-rotational mounting frame.

Protruding axially from the center of the mounting face 24, the housing portion 14 includes an elongate bearing and seal carrier boss referenced with numeral 28. Internally of the boss 28, a rotational armature member generally referenced with numeral 30, is freely rotationally and sealingly received. Outwardly of the armature member 30 protrudes a multi-filament fiber optic cable, referenced with numeral 32. The cable 32 is secured to the armature member 30, and because the latter is freely rotational relative to rotary joint 10, the fiber optic cable 32 is also freely rotatable relative to the stationary structure to which the housing 12 is secured.

Viewing more particularly FIG. 2, it will be seen that the housing 12 opposite the mounting face 24, and at the opening 22, defines an axially extending cylindrical recess 34. Recess 34 is cooperatively defined by a back wall 36, and a cylindrical, annular wall 38. The wall 38 defines a radially inwardly disposed annular surface 40.

Centrally of the recess 34, an inner end portion 42 of armature member 30 extends rotationally into the recess 34 toward but short of the back plate 16. The inner end portion 42 defines a radially outwardly disposed annular surface 44 (only a part of which is visible in FIG. 2) which is radially congruent with the annular surface 40. In other words, the surfaces 40 and 44 define a radially extending annular gap, therebetween, which is generally referenced with the numeral 46.

Spirally disposed in the gap 46 within recess 34, is a length of generally flat and flexibly shape-retaining fiber-carrier ribbon 48. The ribbon 48 secures to the outer surface 44 of armature end portion 42 and extends spirally through several rotations outwardly to secure to the inner surface 40 of wall 38. The ribbon 48 is slightly smaller in width than the depth of recess 34 from back wall 36 to the inner face of cover plate 16. Consequently, the ribbon 48 is freely movably captured in the recess 34. That is, ribbon 48 may freely move radially inwardly and outwardly between the surfaces 40 and 44 within the constraints imposed by its own spiral disposition in recess 34. At its inner end, the ribbon 48 is associated with the fiber optic cable 32, while at its outer end the ribbon is associated with an optical fiber connector 50 disposed outwardly on wall 38.

Turning now to FIG. 3, a cross section of the fiber-carrier ribbon 48 reveals that the latter is composed of a first, and a second layer of flexible, but shape-retaining Mylar or Kapton tape, referenced with numerals 52 and 54, respectively. Between the tapes 52-54, is disposed a layer of elongate parallel optical fibers, 58. The optical fibers 58 individually connect with respective optional fibers of the optical cable 32, and with individual optical fibers of connector 50. The element 52-58 are secured together with adhesive (not shown).

Consequently to the above, the fiber optic cable 32 may be connected with a rotational structure, for example, a sensor-carrier cable on a winch drum. The housing 12 may be carried by a non-rotational frame of the winch. As the winch drum turns to reel and unreel cable from the drum the optical cable 32 and armature 30 are freely rotational relative to the housing 12. As the armature 30 turns in one direction or the other relative to housing 12, the fiber-carrier ribbon 48 winds up or unwinds in its spiral configuration. That is, as depicted in FIG. 2, clockwise rotation of the armature 30 will result in a greater part of ribbon 48 unspiraling against the outer wall 38 at surface 40. Conversely, counterclockwise rotation of the armature 30 will spiral the ribbon 48 more tightly upon the surface 44 of end portion 42.

As presented by way of example, a winch with a length of cable reeled thereon requires only a finite number of turns of the winch drum to completely unreel or to completely reel up the cable. Because the tape 48 is comparatively thin (approximately 0.010 inch) while the gap 46 may be on the order of several inches, or more, there is room within recess 34 for a multiturn spiral of tape 48. While the fiber optic rotary joint 10 can not provide an unlimited number of turns between the armature 30 and housing 12, many applications for rotary connectors and joints do not require more than a finite number of turns of the joint. In these applications the rotary joint 10 embodying the present invention offers several advantages. By way of example again, the joint 10 allows a far greater number of optical fibers to pass through the rotary interface than do conventional joints. For example, forty to five-hundred or more optical fibers can be accommodated by the inventive optical rotary joint. Rotation of the rotary joint does not interface with optical communication therethrough. Also, the housing 12 provides very rugged environmental protection for the rotary joint, and may be pressure sealed to allow a pressure differential between the rotary and stationary environments which the joint connects.

Figure 4:
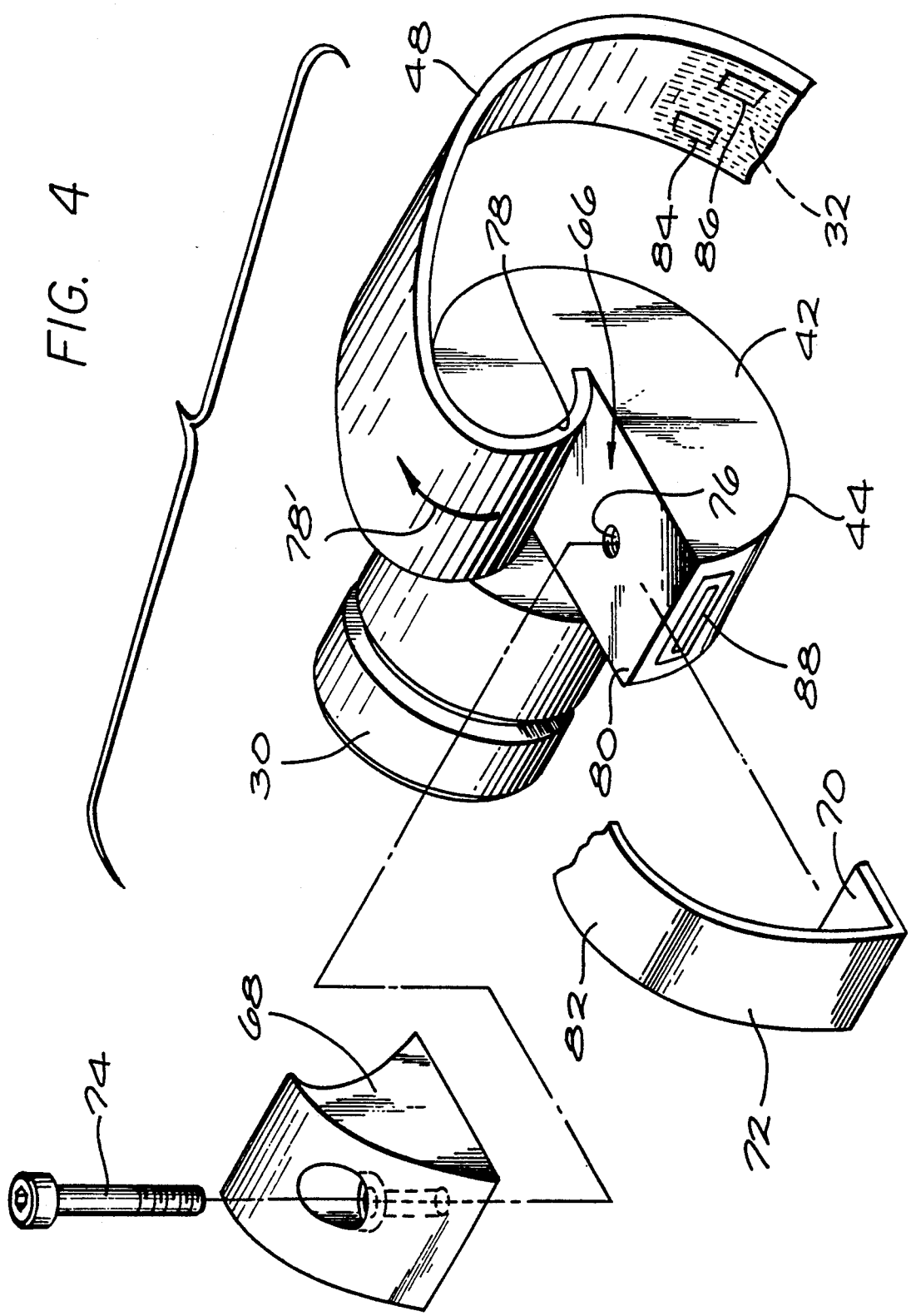
FIG. 4 depicts a partial exploded assembly view of a component of the inventive apparatus.

Returning once again to FIG. 3, it will be seen that the ribbon 48 includes between the tapes 52, 54, and among the fibers 58, three flexible electrical conductors 60-64. The conductors 60-64 are insulated from one another. FIG. 4 provides an illustration of the armature member 30 and its connection with the inner end of ribbon 48 and transition to optical cable 32. Viewing FIG. 4, it is seen that the armature member 30 defines a partially crescent-shaped recess 66. Into the recess 66 are received, in sequence, the inner end of ribbon 48, a partially crescent-shaped key member 68, and an end 70 of a circumferentially extending leaf spring 72. A threaded fastener 74 passes through a bore 76 of the armature member 30, and threadably engages the key 68 to retain the latter, ribbon 48 and spring 72 in recess 66. The ribbon 48 exits recess 66 along an accurate surface 78 thereof to be disposed circumferentially about the outer surface 44 of armature member 30 depicted by arrow 78'. Similarly, spring 72 is clamped at end 70 thereof between the key 68 and a radially extending surface 80 of the recess 66. An external portion 82 of spring 72 circumscribes the surface 44 of armature 30 to yieldably urge the ribbon 48 into engagement wit the surface 44. On a surface of ribbon 48 confronting the armature member 30 at the surface 44 thereof is a pair of electrically conductive contact pads 84, 86. These contact pads 84, 86 are urged into electrically continuous contact with a conductive contact zone 88 on the surface 44 of armature 30.

Returning to FIG. 2, and viewing fragmentary view 2A also, the housing 12 at front part 14 includes a circumferentially extending leaf spring 90 urging an outer end portion of the tape 48 yieldably outwardly toward surface 40 depicted by force arrow 90'. Similarly to the tape segment seen in FIG. 4, the tape segment overwinding.

Figure 2A:
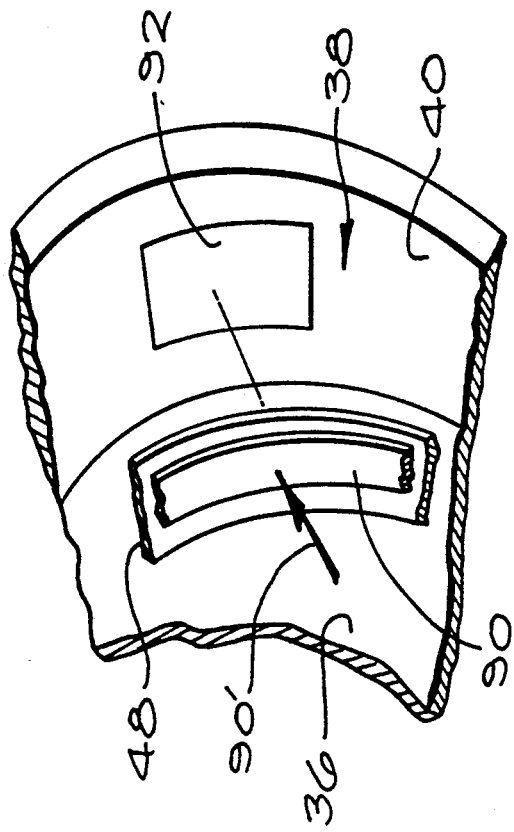
Figure 5:
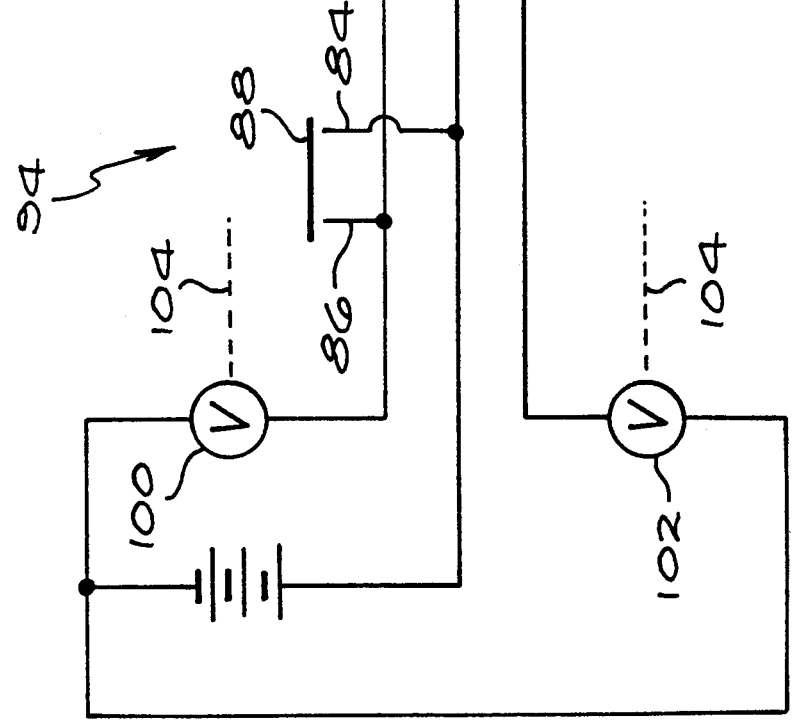
FIG. 5 schematically depicts on electrical circuit embodied partially in the apparatus illustrated by FIGS. 1-4.

FIG. 5 depicts an electrical circuit 94 for safeguarding the fiber optic rotary joint 10, and which includes the conductors 60-64 of the ribbon 48. Viewing FIG. 5, it will be seen that the circuit 94 includes electrical contacts 86 and 88, which are engageable by contact zone 88 to normally close a circuit including conductors 62, 64. Similarly the contacts 96, 98 are normally closed by contact zone 92 (recalling FIG. 2A to complete the circuit of conductors 60, 62. Respective indicators 100, 102 respond to lose of continuity in either of the circuits described, and interface with disabling means (not shown but depicted by dashed lines 104) to stop further relative rotation of the armature seen in FIG. 2A includes a pair of electrical contact pads, which are not visible in the Figure, but which confront an electrical contact zone 92 on surface 40 of wall 38. The normal operative condition of the rotary joint 10 is with the contact pads 84, 86 of FIG. 4, and the pads described by reference to FIG. 2A electrically connecting by the contact zones 88 and 92, respectively. So long as the armature member 30 is not rotated an excessive number of turns in either direction relative to housing 12, this normal operative condition will be pressured by the yieldable bias of the springs 72 and 90. However, if the armature 30 is overwound in either direction, the ribbon 48 will be pulled away from surface 40 or 44, dependent upon the direction of 30 and housing 12.

I claim:

1. A rotary joint comprising: a housing defining a cavity therewithin, and a radially inwardly disposed annular first surface outwardly bounding said cavity, an armature member journaled on said housing and extending inwardly of said cavity centrally thereof, said armature member defining a radially outwardly disposed annular second surface in radial congruence with and confronting said first surface, said first and second surfaces cooperatively defining therebetween a radial gap, an elongate flexible conduit carrier member spirally extending across said gap between said housing and said armature member, and at least one conduit extending between said armature member and said housing along said conduit carrier member.

2. The invention of claim 1 wherein said cavity is sealingly closed by said housing, said armature member sealingly and rotationally extending from outside said housing inwardly of said cavity.

3. The invention of claim 1 wherein said first and said second surfaces are axially elongate, said conduit carrier member also being axially elongate relative said housing and being ribbon-like.

4. The invention of claim 1 wherein said conduit carrier member spirally extends across said gap and includes a finite number of complete spirals within said cavity.

5. The invention of claim 1 wherein said conduit carrier member at one end secures to said armature member and at and the other end secures to said housing and said carrier member ends being rotational relative one another.

6. The invention of claim 5 wherein said conduit member communicates between said armature member and said housing to convey a media therebetween.

7. The invention of claim 6 wherein said armature member and said housing each define outwardly thereof means for communicating media with said conduit.

8. The invention of claim 7 wherein said conduit includes an optional fiber, and said media includes light communicating along said optical fiber.

9. The invention of claim 1 further including a plurality of said conduits arranged axially side-by-side upon said conduit carrier member.

10. The invention of claim 9 wherein said conduit carrier member includes a flexible shape retaining tape of Mylar or Kapton and is ribbon-like.

11. The invention of claim 1 further including means for limiting the number of relative rotations of said armature member relative said housing.

12. The invention of claim 11 wherein said means for limiting includes at least a single electrical conductor extending along said conduit carrier member contact means adjacent one of said housing and armature member for responding to a change of position of said conduit carrier member relative thereto incident to overwinding of said conduit carrier member by effecting a change in continuity of an electrical circuit including said conductor, yieldable biasing means urging said conduit carrier to a selected position relative said housing wherein said circuit has a selected continuity and said spiral extension of said carrier member is not overwound, and disabling means responsive to said change in circuit continuity for stopping relative rotation of said housing and armature responsive to said change in continuity of said circuit.

13. A rotary fiber optic joint apparatus for conveying multiple fiber optic conduits between a rotating reference frame and a nonrotating reference frame, said joint apparatus comprising:

a chambered housing defining therewithin a confined axially extending cavity bounded radially outwardly by an annular wall surface of said housing;

an armature member journaled by said housing, defining a radially outwardly disposed annular surface radially in congruence with and confronting said annular wall surface to define a radial gap therewith;

a flexible shape-retaining elongate carrier member securing at one end to said armature member and extending spirally across said radial gap through plural spirals to secure at the opposite end thereof to said housing;

plural elongate optical fibers extending length wise of said carrier member between said armature member and said housing; and communication means associated with each of said armature and housing for communicating optically externally of said apparatus with respective ends of said optical fibers upon said carrier member.

14. The invention of claim 13 wherein said carrier member secures to said housing and said armature adjacent said respective ends and is substantially tangent in each case with said annular surfaces.

15. The invention of claim 14 further including yieldable resident means adjacent one of said respective ends for urging an adjacent otherwise unrestrained length of said carrier member into a position of tangency with a respective portion one of said annular surfaces, and disabling means for preventing further overwinding rotation of said armature relative said housing in response to a pulling away of said conduit carrier member length from said tangency position.

16. The invention of claim 15 further including at least one electrical conductor extending lengthwise of said carrier member between said armature member and said housing, an electrical circuit including said electrical conductor, means adjacent said conduit carrier member unrestrained length for altering a characteristic of said circuit in response to said pulling away of said carrier member length from said tangency position, and responsive means for stopping further rotation of said armature member in a rotational direction which would further said pulling away of said carrier member length from said tangency position in response to said alteration of electrical circuit characteristic.

17. The invention of claim 13 wherein said housing is generally cup-shaped having an axially extending recess opening axially upon said housing at one end, and an end wall bounding said recess opposite said opening, said housing further including a closure member spanning said opening to cooperatively bound said cavity within said housing recess, a wall of said housing circumscribing said recess and defining a radially inwardly disposed surface radially outwardly bounding the latter.

18. The invention of claim 17 wherein said housing defines a central axially outwardly extending boss at said end wall, said armature member journaling within said boss to expose outwardly of said housing and extending into said cavity.

19. The invention of claim 13 wherein said carrier member comprises a laminate of elongate tapes sandwiching said optical fibers therebetween.

20. The invention of claim 19 wherein said elongate tapes are of Mylar or Kapton material.

21. The method of providing optical communication between two relatively rotating reference frames, said method including the steps of:
   extending optical fibers from end to end lengthwise along an elongate flexible shape-returning carrier member;
   forming said carrier member into a spiral of multiple wraps;
   associating a respective end of said carrier member with each of said two reference frames so that the axis of said spiral aligns with the axis of relative rotation between said reference frames, and
   communicating optically along said fibers by light transmission therein between said reference frames as the latter relatively rotate within the constraint of said multi-wrap spiral.

22. The method of claim 21 further including the steps of providing an inner outwardly disposed annular surface associated with one of said reference frames, providing an outer inwardly disposed annular surface associated with the other of said reference frames, using said surfaces to define a radial gap therebetween, disposing said spiral of carrier member in said gap, and spiraling said elongate carrier member to and fro between said surfaces across said radial gap in response to relative rotations of said reference frames in respective opposite directions.

23. The method of claim 22 further including the step of using an elongate tape of Mylar or Kapton material as part of said carrier member.

24. The method of claim 22 further including the step of securing said carrier member at opposite ends to respective ones of said inner and outer annular surfaces substantially tangent therewith.

* * * * *